US010614260B2

(12) United States Patent
Tsai et al.

(10) Patent No.: US 10,614,260 B2
(45) Date of Patent: Apr. 7, 2020

(54) MODEL-BUILDING METHOD FOR BUILDING TOP INTERFACE LOGIC MODEL

(71) Applicants: GLOBAL UNICHIP CORPORATION, Hsinchu (TW); TAIWAN SEMICONDUCTOR MANUFACTURING CO., LTD., Hsinchu (TW)

(72) Inventors: Meng-Hsiu Tsai, Hsinchu (TW); Hsin-Hsiung Liao, Hsinchu (TW); Min-Hsiu Tsai, Hsinchu (TW)

(73) Assignees: GLOBAL UNICHIP CORPORATION, Hsinchu (TW); TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 2 days.

(21) Appl. No.: 15/992,213

(22) Filed: May 30, 2018

(65) Prior Publication Data
US 2019/0294746 A1    Sep. 26, 2019

(30) Foreign Application Priority Data
Mar. 26, 2018  (CN) .......................... 2018 1 0255418

(51) Int. Cl.
*G06F 17/50*    (2006.01)
*G06F 30/3312*    (2020.01)
(Continued)

(52) U.S. Cl.
CPC ........ *G06F 30/3312* (2020.01); *G06F 30/327* (2020.01); *G06F 2111/20* (2020.01); *G06F 2119/12* (2020.01)

(58) Field of Classification Search
CPC .............. G06F 17/5031; G06F 17/505; G06F 2217/02; G06F 2217/84; G06F 17/50;
(Continued)

(56) References Cited

U.S. PATENT DOCUMENTS 6,678,644 B1    1/2004   Segal
8,365,113 B1 *  1/2013   Bhardwaj ............. G06F 17/505
                                                  716/104

FOREIGN PATENT DOCUMENTS

TW              200802013 A    1/2008

* cited by examiner

*Primary Examiner* — Vuthe Siek
(74) *Attorney, Agent, or Firm* — CKC & Partners Co., LLC

(57) ABSTRACT

A model-building method comprises following operations: reading a top netlist and a block model, wherein the top netlist comprises a first input node, a first output node and a multivibrator, the block model comprises a input node and a output node; obtaining a first subnetlist from the top netlist, wherein the first subnetlist comprises a component coupled between the input node and the first input node or the multivibrator; obtaining a second subnetlist from the top netlist, wherein the second subnetlist comprises a component coupled between the output node and the first output node or the multivibrator; obtaining a third subnetlist from the top netlist, wherein the third subnetlist comprises a component coupled between a clock input node of the multivibrator and a top clock input node of the top netlist; generating a top ILM according to the first to the third subnetlist.

10 Claims, 11 Drawing Sheets

(51) Int. Cl.
*G06F 30/327* (2020.01)
*G06F 111/20* (2020.01)
*G06F 119/12* (2020.01)

(58) Field of Classification Search
CPC ............... G06F 30/3312; G06F 30/327; G06F 2111/20; G06F 2119/12
See application file for complete search history.

MODEL-BUILDING METHOD FOR BUILDING TOP INTERFACE LOGIC MODEL

CROSS-REFERENCE TO RELATED APPLICATION

This application claims priority to Chinese Application Serial Number 201810255418.5, filed Mar. 26, 2018, which is herein incorporated by reference in its entirety.

BACKGROUND

Field of Invention

The present invention relates to a model-building method. More particularly, the present invention relates to a model-building method for building the top interface logic model.

Description of Related Art

As the amount of components of an integrated circuit significantly growing, the hierarchical design method has been extensively used in the integrated circuit design process. For example, the integrated circuit may be divided into a top circuit and multiple block circuits, and the multiple block circuits can be designed by different teams to accelerate the design process. When the multiple block circuits are integrated into the top circuit to realize the complete integrated circuit, the static timing analysis (STA) is required for the multiple block circuits and the top circuit. Since the interface logic model (ILM) can focus on obtaining the important netlist of a circuit netlist, a block circuit usually presents as a corresponding ILM in the STA to reduce the required operation time of the STA. However, in a situation that the top circuit comprises large amount of components, the ILMs of the block circuits cannot effectively reduce the required operation time of the STA.

SUMMARY

The disclosure provides a model-building method. The model-building method comprises following operations: reading a top netlist and a block model, wherein the top netlist comprises a first input node, a first output node and at least one multivibrator, the block model comprises at least one input node and at least one output node; obtaining a first subnetlist from the top netlist, wherein the first subnetlist comprises at least one component coupled between the at least one input node of the block model and the first input node or between the at least one input node of the block model and the at least one multivibrator; obtaining a second subnetlist from the top netlist, wherein the second subnetlist comprises at least one component coupled between the at least one output node of the block model and the first output node or between the at least one output node of the block model and the at least one multivibrator; obtaining a third subnetlist from the top netlist, wherein the third subnetlist comprises at least one component coupled between a clock input node of the at least one multivibrator and a top clock input node of the top netlist; and generating a top ILM according to the first subnetlist, the second subnetlist, and the third subnetlist.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
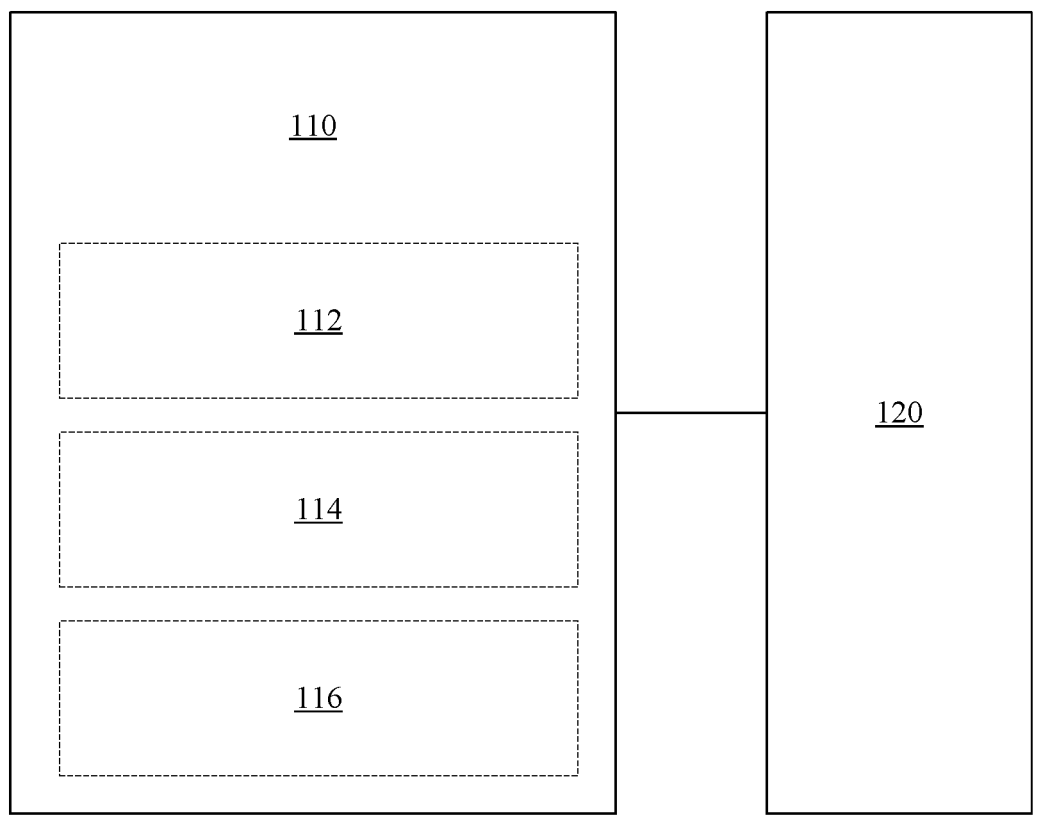
FIG. 1 is a simplified functional block diagram of a model-building system 100 according to one embodiment of the disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a simplified functional block diagram of a model-building system 100 according to one embodiment of the disclosure. The model-building system 100 comprises a storage module 110 and a processor 120. The storage module 110 is configured to store a top netlist 112, a block model 114, and a top ILM 116. The processor 120 is configured to read the top netlist 112 and the block model 114 from the storage module 110, and generate the top ILM 116 according to the top netlist 112 and the block model 114. For the sake of brevity, other functional blocks of the model-building system 100 are not shown in FIG. 1.

In practice, the storage module 110 may be realized by the hard disk, flash disk, or other varies of suitable devices capable of storing data. The processor 120 may be realized by the microprocessor, the application specific integrated circuit (ASIC), the field programmable gate array (FPGA), or other varies of suitable devices having data processing capability.

In addition, the block model 114 may be a block netlist comprising the complete block circuit. In some embodiment, the block model 114 may be a block ILM or an extracted timing model (ETM) comprising only important components of the complete block circuit, so as to reduce the computation load of the processor 120 for generating the top ILM 116.

Figure 2:
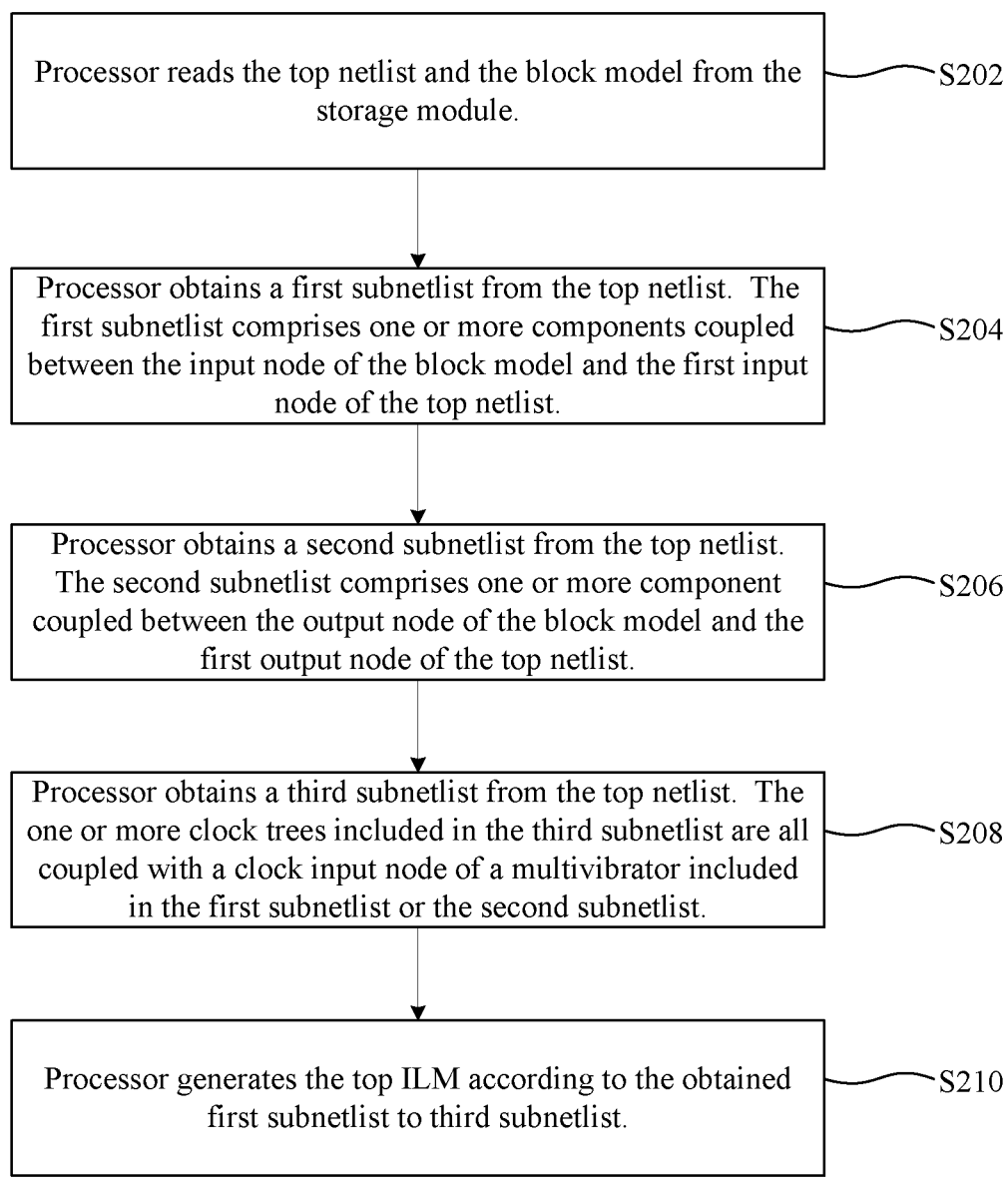
FIG. 2 is a simplified flowchart of a model-building method 200 according to one embodiment of the disclosure.

FIG. 2 is a simplified flowchart of a model-building method 200 according to one embodiment of the disclosure. The model-building system 100 is suitable for executing the model-building method 200 to generate the top ILM 116. In operation S202, the processor 120 may read the top netlist 112 and the block model 114 from the storage module 110, and integrate the block model 114 into the top netlist 112 as illustrated by FIG. 3.

Figure 3:
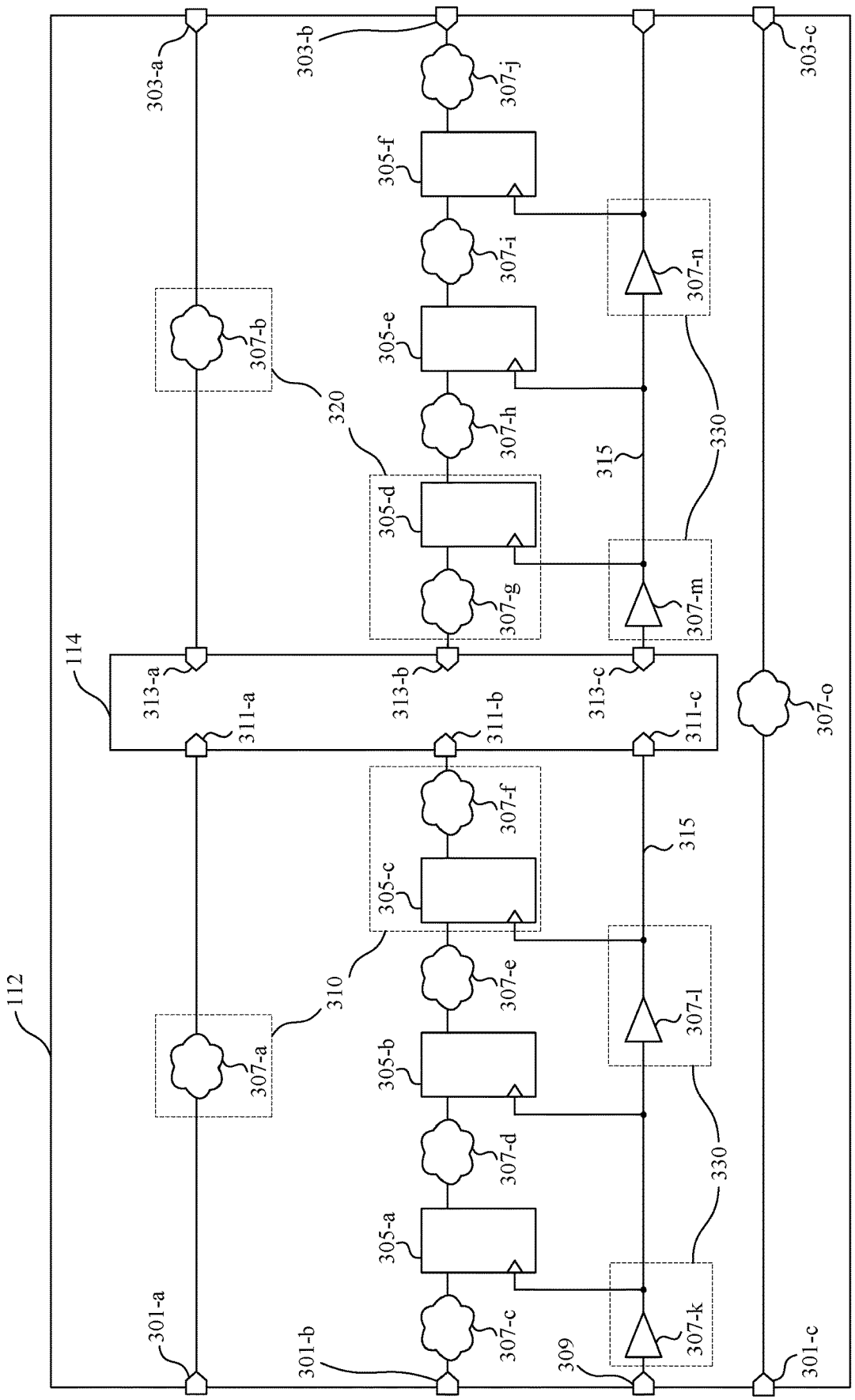
FIG. 3 is a schematic diagram for illustrating the integrated top netlist and block model according to one embodiment of the disclosure.

As shown in FIG. 3, the top netlist 112 comprises first input node to third input node 301-a~301-c, first output node to third output node 303-a~303-c, multiple multivibrators 305-a~305-f, multiple logic components 307-a~307-o, and a top clock input node 309. The block model 114 comprises multiple input nodes 311-a~311-c and multiple output nodes 313-a~313-c.

In addition, the top netlist 112 further comprises a clock tree 315. The clock tree 315 is coupled to the top clock input node 309, the input node 311-c and output node 313-c of the block model 114, and clock input nodes of the multivibrators 305-a~305-f. The clock tree 315 further comprises logic components 307-k, 307-l, 307-m, and 307-n.

Throughout the specification and drawings, indexes a~n may be used in the reference numbers of components and devices for ease of referring to respective components and devices. The use of indexes a~n does not intend to restrict the amount of components and devices to any specific number. In some embodiment, the top netlist 112 may comprise at least one multivibrator and at least one logic component, and the block model 114 may comprise at least one input node and at least one output node.

Please refer to FIGS. 2 and 3, in operation S204, the processor 120 may obtain a first subnetlist 310 from the top netlist 112. The first subnetlist 310 may comprise one or more components coupled between the input node 311-a of the block model 114 and the first input node 301-a of the top netlist 112 (e.g., the logic component 307-a). The first subnetlist 310 may also comprise one or more components coupled between the input node 311-b of the block model 114 and the multivibrator 305-c (e.g., the multivibrator 305-c and the logic component 307-f).

It is worth mentioning that the first input node 301-a of the top netlist 112 and the input node 311-a of the block model 114 are both not coupled with any multivibrator, and the multivibrator 305-c is a previous stage multivibrator of the block model 114. That is, there is no other multivibrator coupled between the multivibrator 305-c and the block model 114.

Then, the processor 120 may execute operation S206 to obtain a second subnetlist 320 from the top netlist 112. The second subnetlist 320 may comprise one or more component coupled between the output node 313-a of the block model 114 and the first output node 303-a of the top netlist 112 (e.g., the logic component 307-b). The second subnetlist 320 may also comprise one or more component coupled between the output node 313-b of the block model 114 and the multivibrator 305-d (e.g., the multivibrator 305-d and the logic component 307-g).

It is worth mentioning that the first output node 303-a of the top netlist 112 and the output node 313-a of the block model 114 are both not coupled with any multivibrator, and the multivibrator 305-d is a next stage multivibrator of the block model 114. That is, there is no other multivibrator coupled between the multivibrator 305-d and the block model 114.

In operation S208, the processor 120 may obtain a third subnetlist 330 from the top netlist 112. The third subnetlist 330 may comprise one or more components coupled between the top clock input node 309 of the top netlist 112 and a clock input node of the multivibrator 305-c, or between the top clock input node 309 of the top netlist 112 and a clock input node of the multivibrator 305-d. That is, the third subnetlist 330 comprises the clock tree 315 and the logic components 307-k, 307-l, 307-m, or 307-n of the clock tree 315.

In some embodiment, the third subnetlist 330 comprises multiple different clock trees, and the multiple clock trees coupled with the clock input node of the multivibrator 305-c or the clock input node of the multivibrator 305-d.

Accordingly, the one or more clock trees included in the third subnetlist 330 are all coupled with a clock input node of a multivibrator included in the first subnetlist 310 or the second subnetlist 320.

Figure 4:
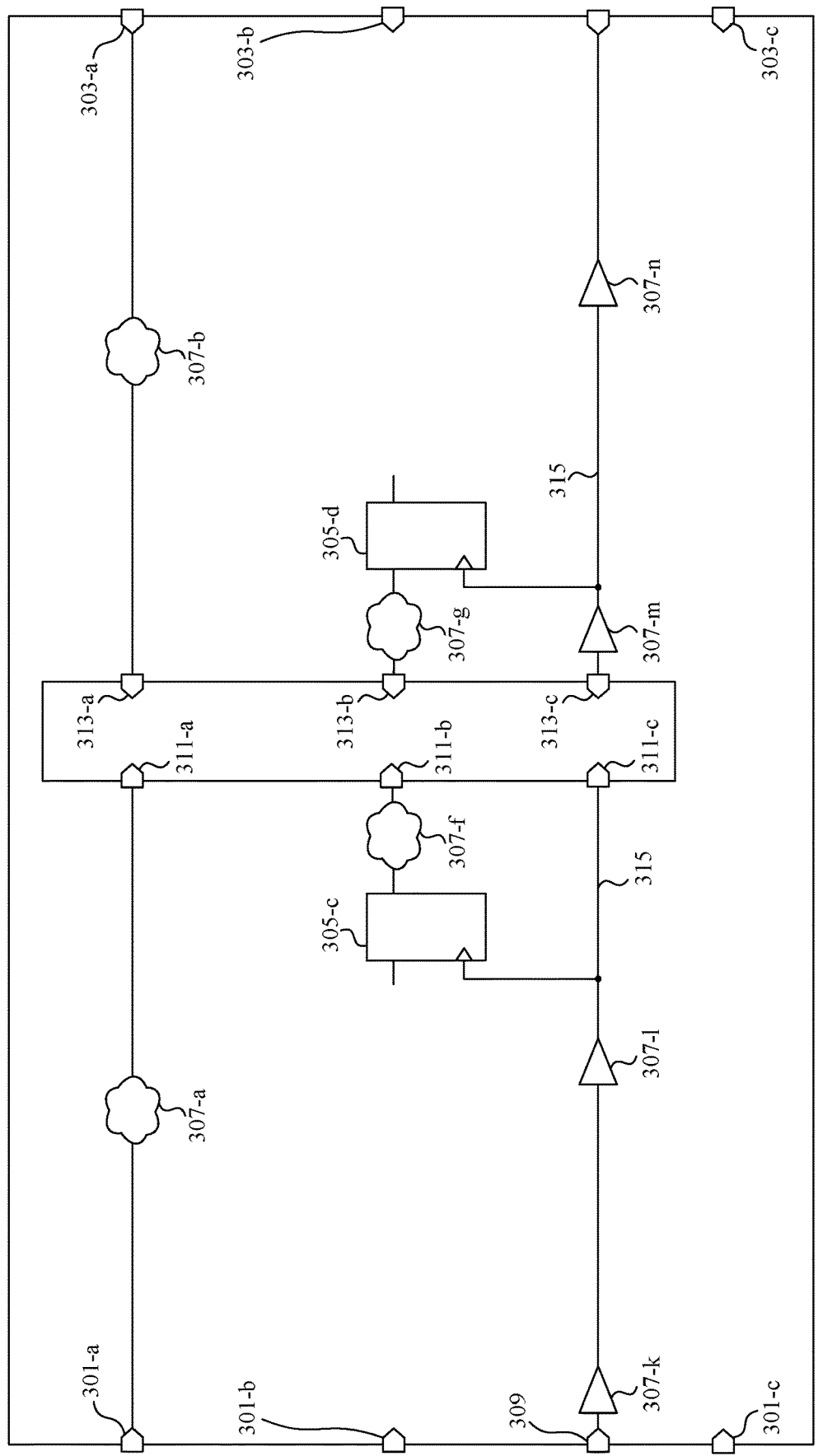
FIG. 4 is a simplified schematic diagram of a top ILM according to one embodiment of the disclosure.

In operation S210, the processor 120 may generate the top ILM 116, as shown in FIG. 4, according to the obtained first subnetlist 310, second subnetlist 320, and third subnetlist 330. As shown in FIG. 4, the top ILM 116 preserves the important circuit netlist of the top netlist 112, and omits the multivibrators 305-a, 305-b, 305-e, and 305-f and the logic component 307-c~307-e, 307-h~307-j.

Please note that the execution orders of the operations illustrated in FIG. 2 is merely an exemplary embodiment, rather than a restriction to the practical implementations.

In some embodiment, for example, the execution orders of the operations S204~S208 may be switched with each other.

Figure 5:
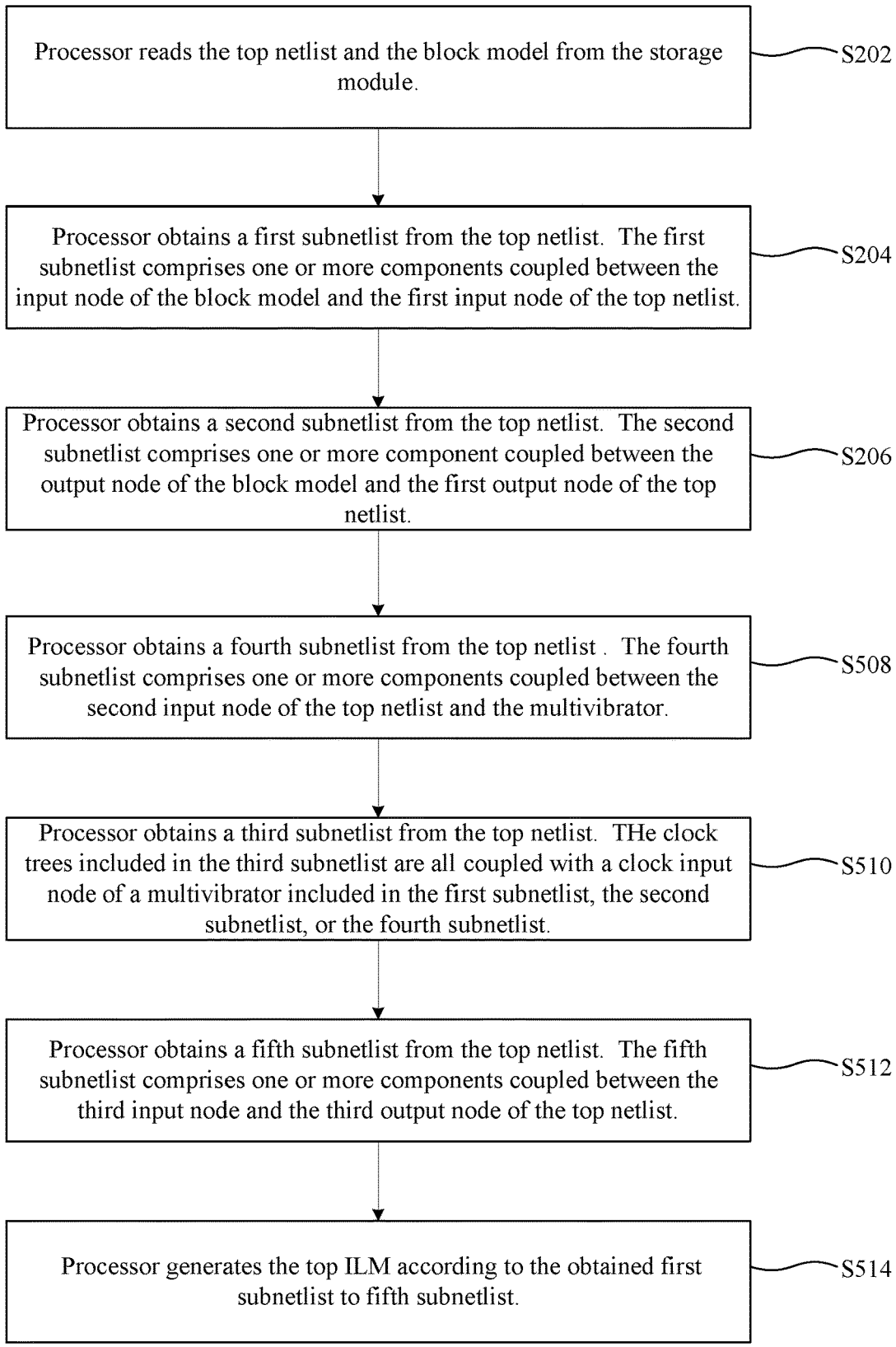
FIG. 5 is a simplified flowchart of a model-building method 500 according to another embodiment of the disclosure.

FIG. 5 is a simplified flowchart of a model-building method 500 according to another embodiment of the disclosure. The model-building system 100 is suitable for executing the model-building method 500 to generate the top ILM 116. The operations S202~S206 of the model-building method 500 are similar to the correspondingly operations S202~S206 of the model-building method 200, for the sake of brevity, those descriptions will not be repeated here.

Figure 6:
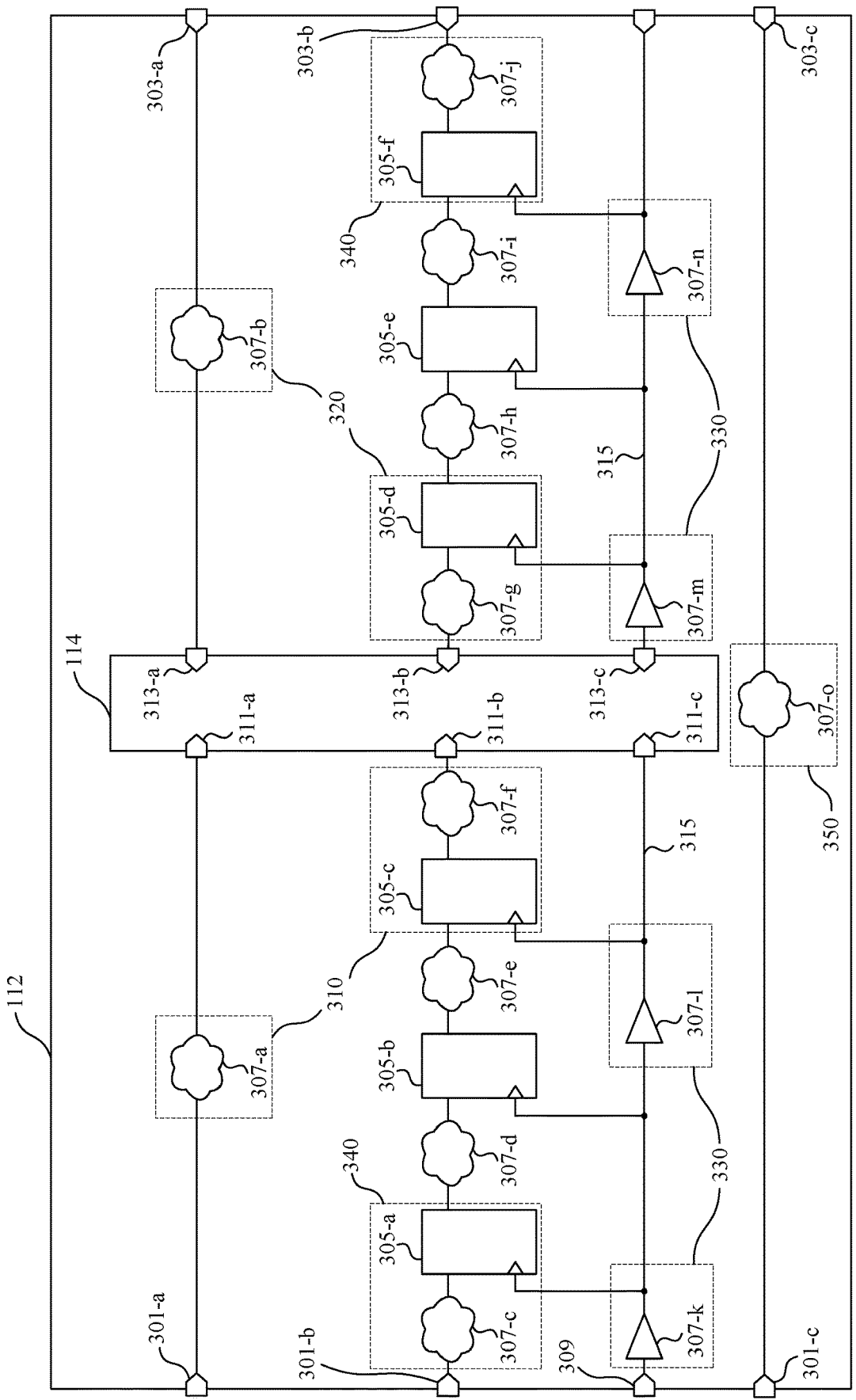
FIG. 6 is a schematic diagram for illustrating the integrated top netlist and block model according to another embodiment of the disclosure.

In this embodiment, the processor 120 may first obtain a fourth subnetlist 340 from the top netlist 112, and then obtain the third subnetlist 330 including the clock tree 315. For example, please refer to FIGS. 5 and 6, the processor 120 may first execute operation S508 to obtain the fourth subnetlist 340 from the top netlist 112. The fourth subnetlist 340 may comprise one or more components coupled between the second input node 301-b of the top netlist 112 and the multivibrator 305-a (e.g., the multivibrator 305-a and the logic component 307-c). The fourth subnetlist 340 may also comprise one or more components coupled between the second output node 303-b of the top netlist 112 and the multivibrator 305-f (e.g., the multivibrator 305-f and the logic component 307-j).

It is worth mentioning that the multivibrator 305-a is a first stage multivibrator of the top netlist 112, and the multivibrator 305-f is a last stage multivibrator of the top netlist 112.

Then, the processor 120 may execute operation S510 to obtain the third subnetlist 330 including the clock tree from the top netlist 112. The third subnetlist 330 may comprise one or more components coupled between the top clock input node 309 of the top netlist 112 and a clock input node of the multivibrator 305-a, a clock input node of the multivibrator 305-c, a clock input node of the multivibrator 305-d, or a clock input node of the multivibrator 305-f. That is, the third subnetlist 330 comprises the clock tree 315 and the logic components 307-k, 307-l, 307-m, or 307-n of the clock tree 315.

In some embodiment, the third subnetlist 330 comprises multiple different clock trees, and the multiple clock trees are coupled with the clock input node of the multivibrator 305-a, the clock input node of the multivibrator 305-c, the clock input node of the multivibrator 305-d, or the clock input node of the multivibrator 305-f.

Accordingly, the one or more clock trees included in the third subnetlist 330 are all coupled with a clock input node of a multivibrator included in the first subnetlist 310, the second subnetlist 320, or the fourth subnetlist 340.

In operation S512, the processor 120 may obtain a fifth subnetlist 350 from the top netlist 112. The fifth subnetlist 350 comprises one or more components coupled between the third input node 301-c and the third output node 303-c of the top netlist 112 (e.g., the logic component 307-o).

It is worth mentioning that the third input node 301-c and the third output node 303-c of the top netlist 112 are both not coupled with any multivibrator.

Figure 7:
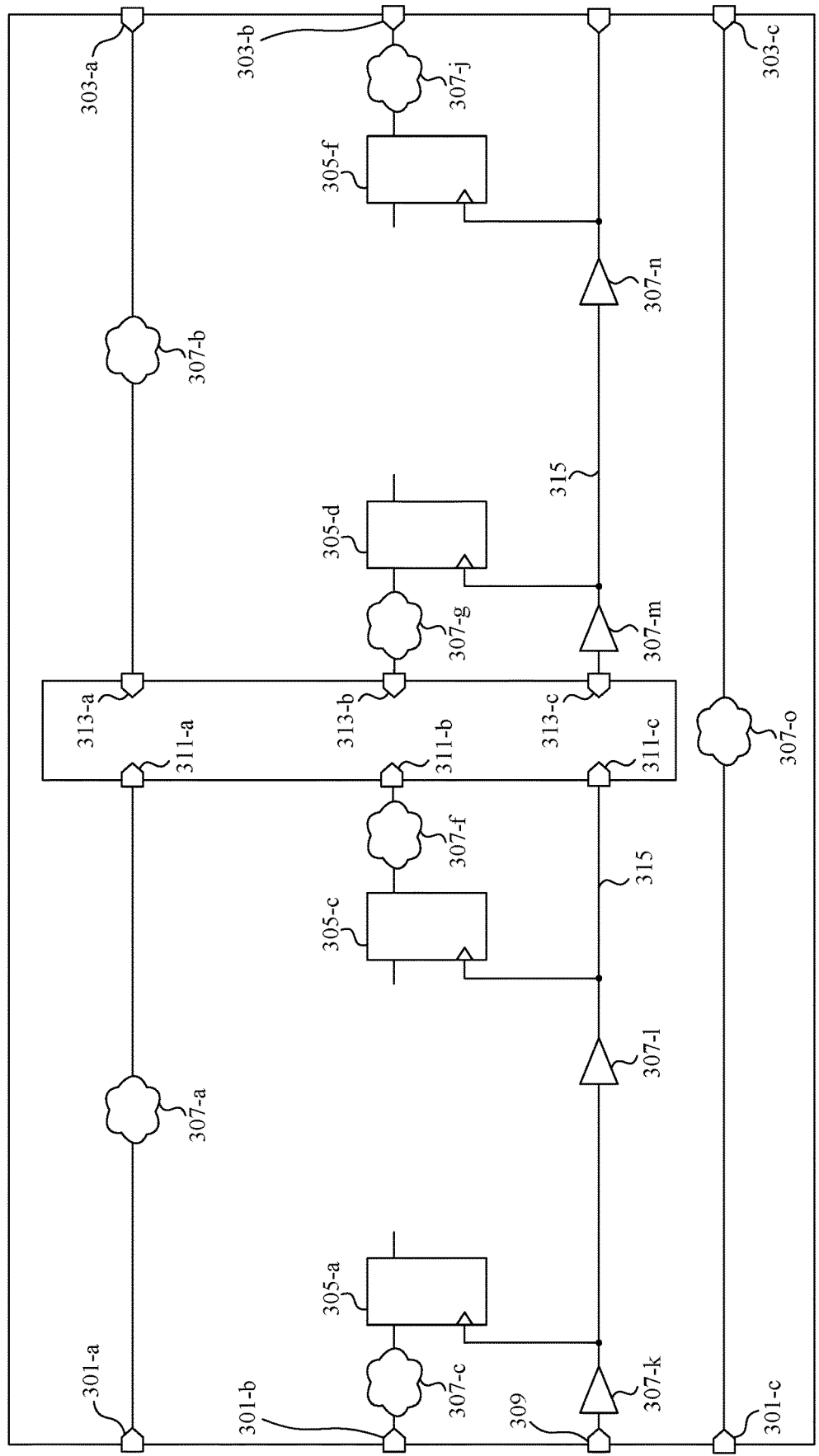
FIG. 7 is a simplified schematic diagram of a top ILM according to another embodiment of the disclosure.

In operation S514, the processor 120 may generate the top ILM 116, as shown in FIG. 7, according to the obtained first subnetlist 310, second subnetlist 320, third subnetlist 330, fourth subnetlist 340, and fifth subnetlist 350. As shown in FIG. 7, the top ILM 116 preserves the important circuit netlist of the top netlist 112, and omits the multivibrators 305-b and 305-e and the logic components 307-d, 307-e, 307-h, and 307-i.

Figure 8:
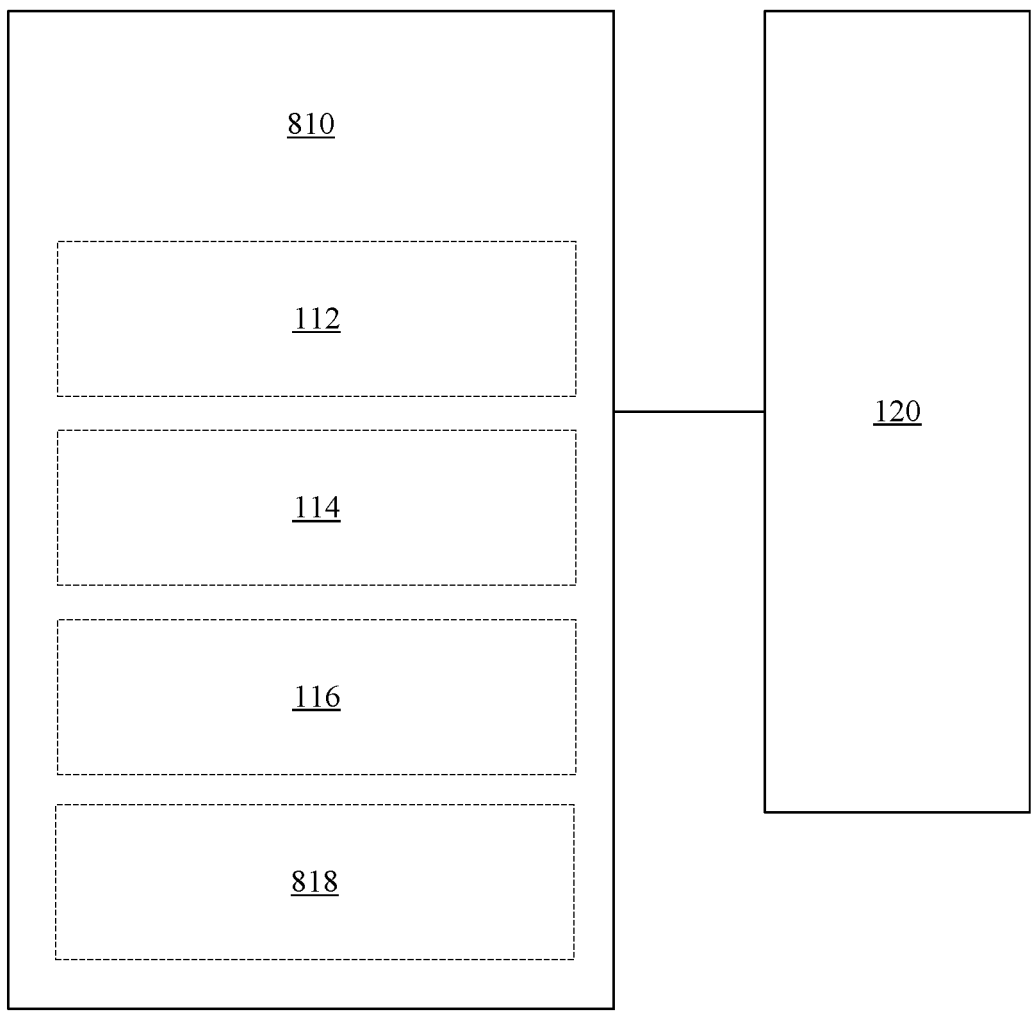
FIG. 8 is a simplified functional block diagram of a model-building system 800 according to one embodiment of the disclosure.

FIG. 8 is a simplified functional block diagram of a model-building system 800 according to one embodiment of the disclosure. The model-building system 800 is similar to the model-building system 100, the difference is that the storage module 810 of the model-building system 800 stores a resistor-capacitor (RC) netlist 818. The RC netlist 818 comprises parasitic resistors and capacitors locating at the connecting paths between the components of the top netlist 112.

Figure 9:
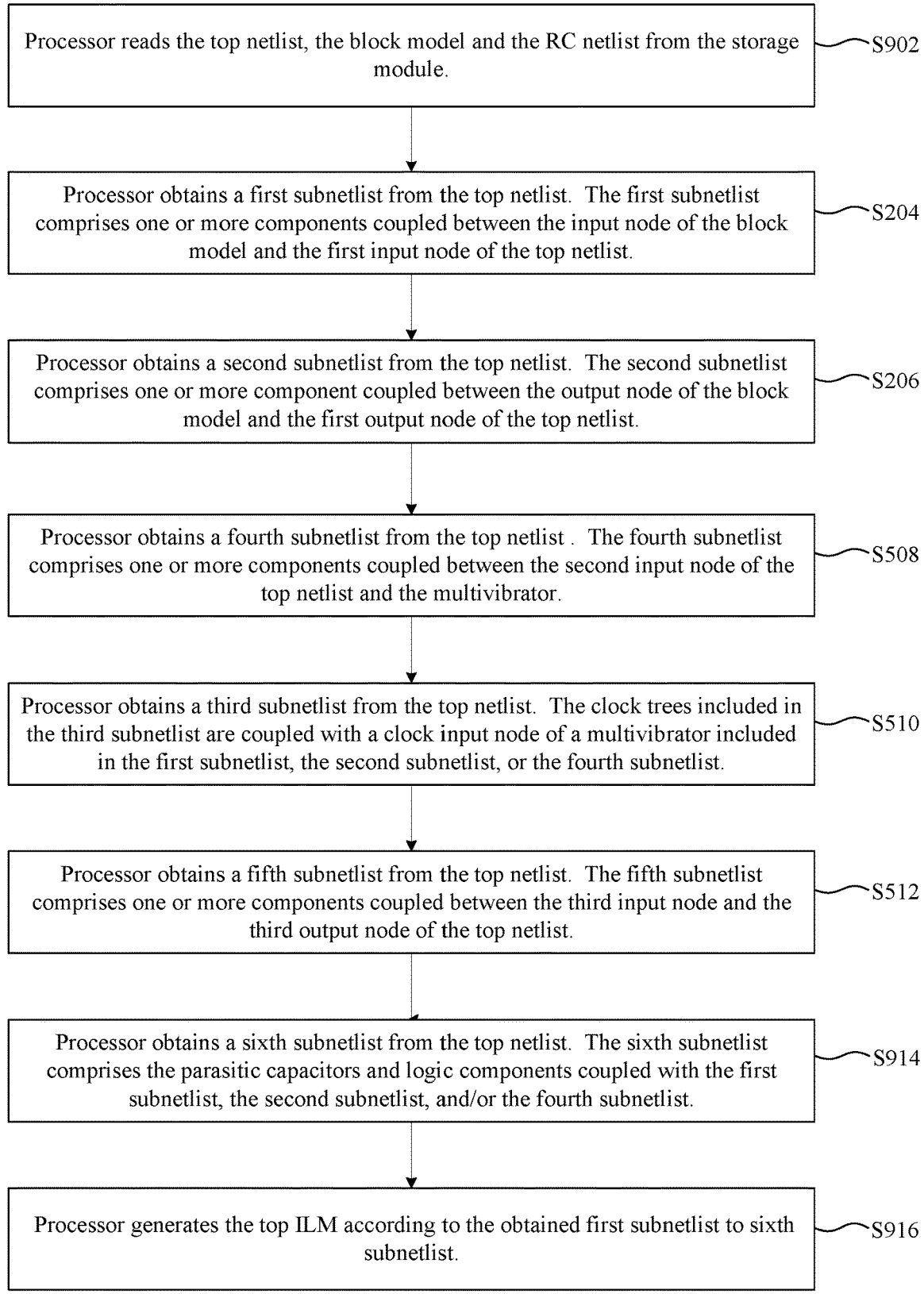
FIG. 9 is a simplified flowchart of a model-building method 900 according to yet another embodiment of the disclosure.
Figure 10:
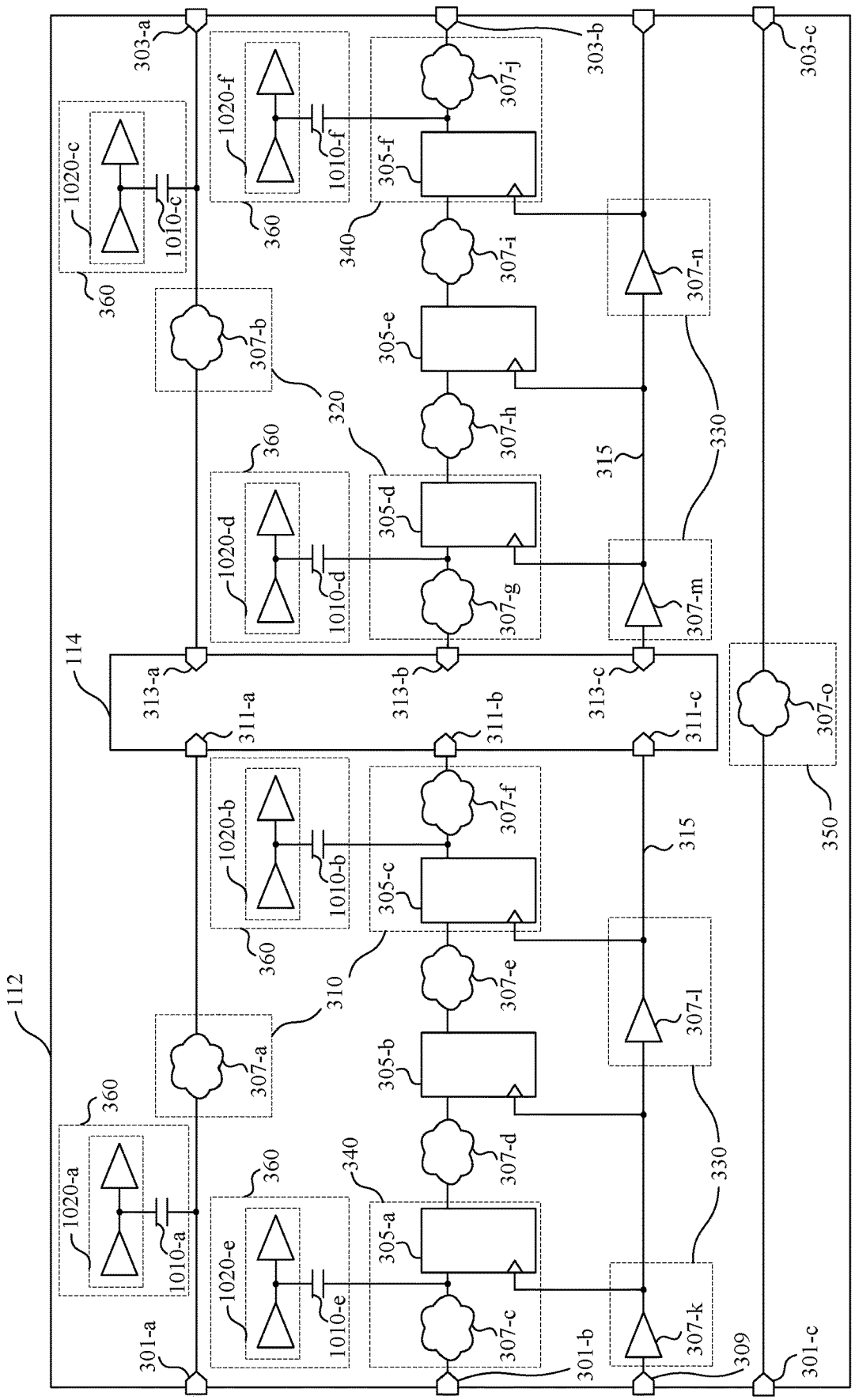
FIG. 10 is a schematic diagram for illustrating the integrated top netlist, block model, and RC netlist according to one embodiment of the disclosure.

FIG. 9 is a simplified flowchart of a model-building method 900 according to yet another embodiment of the disclosure. The model-building system 800 is suitable for executing the model-building method 900 to generate the top ILM 116. In operation S902, the processor 120 may read the top netlist 112, the block model 114, and the RC netlist 818 from the storage module 810. Then, as shown in FIG. 10, the processor 120 may integrate the block model 114 and multiple parasitic capacitors 1010-a~1010-f of the RC netlist 818 into the top netlist 112. In addition, also as shown in FIG. 10, the top netlist 112 of this embodiment further comprises logic components 1020-a~1020-f.

The processor 120 may then execute the operations S204~S206 and S508~S512 to obtain the first subnetlist 310 to the fifth subnetlist 350 from the top netlist 112. The operations S204~S206 and S508~S512 of the model-building method 900 are similar to the corresponding operations S204~S206 and S508~S512 of the model-building method 500, for the sake of brevity, those descriptions will not be repeated here.

In operation S914, the processor 120 may obtain the sixth subnetlist 360 from the top netlist 112. As shown in FIG. 10, the sixth subnetlist 360 comprises the multiple parasitic capacitors 1010-a~1010-f from the RC netlist 818, and also comprises logic components 1020-a~1020-f coupled with the parasitic capacitors 1010-a~1010-f, respectively. In addition, the parasitic capacitors 1010-a and 1010-b are coupled with the first subnetlist 310, the parasitic capacitors 1010-c and 1010-d are coupled with the second subnetlist 320, and the parasitic capacitors 1010-e and 1010-f are coupled with the fourth subnetlist 340.

In other words, the sixth subnetlist 360 comprises the parasitic capacitors 1010-a~1010-f coupled with the first subnetlist 310, the second subnetlist 320, and/or the fourth subnetlist 340, and comprises logic components 1020-a~1020-f coupled with the first subnetlist 310, the second subnetlist 320, and/or the fourth subnetlist 340 through the parasitic capacitors 1010-a~1010-f. However, the sixth subnetlist 360 would not comprise other parasitic capacitors (not shown in FIG. 10) of the RC netlist 818 which are not coupled with the first subnetlist 310, the second subnetlist 320, or the fourth subnetlist 340.

Figure 11:
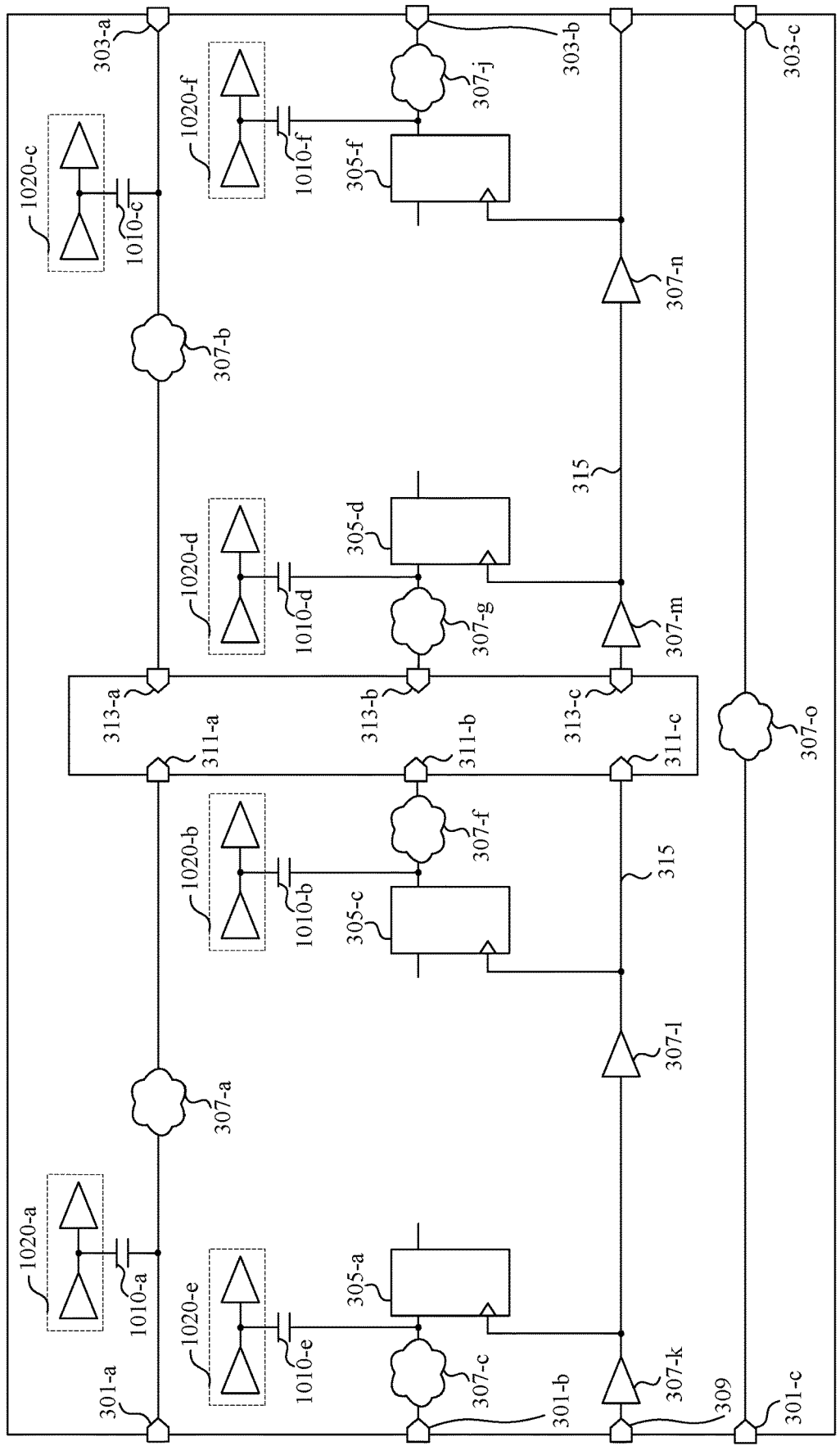
FIG. 11 is a simplified schematic diagram of a top ILM according to yet another embodiment of the disclosure.

Then, the processor 120 may execute operation S916 to generate the top ILM 116, as shown in FIG. 11, according to the obtained first subnetlist 310 to the sixth subnetlist 360. As shown in FIG. 11, the top ILM 116 preserves the important circuit netlist of the top netlist 112, and omits the multivibrators 305-b and 305-e and logic components 307-d, 307-e, 307-h, and 307-i.

As can be appreciated form the foregoing descriptions, the top ILM 116 preserves the important circuit netlist of the top netlist 112 and omit other components of the top netlist 112, wherein the important circuit netlist of the top netlist 112 is needed for executing the STA. As a result, in a situation that the top netlist 112 comprises a large number of components, the top ILM 116 can reduce the required operation time for executing the STA.

In addition, the parasitic capacitors 1010-a~1010-f included in the top ILM 116 of FIG. 11 can make the result of the STA include a more precise signal transmitting time.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A model-building method, comprising:
  reading, by a processor, a top netlist and a block model, wherein the top netlist comprises a first input node, a first output node, and at least one multivibrator, the block model comprises at least one input node and at least one output node, and the top netlist is outside a boundary of the block model;
  obtaining, by the processor, a first subnetlist from the top netlist, wherein the first subnetlist comprises at least one component coupled between the at least one input node of the block model and the first input node or between the at least one input node of the block model and the at least one multivibrator;

obtaining, by the processor, a second subnetlist from the top netlist, wherein the second subnetlist comprises at least one component coupled between the at least one output node of the block model and the first output node or between the at least one output node of the block model and the at least one multivibrator;

obtaining, by the processor, a third subnetlist from the top netlist, wherein the third subnetlist comprises at least one component coupled between a clock input node of the at least one multivibrator and a top clock input node of the top netlist; and generating, by the processor, a top interface logic model simplified from the top netlist, wherein the top interface logic model comprises the first subnetlist, the second subnetlist, and the third subnetlist.

2. The model-building method of claim 1, wherein if the first subnetlist comprises the at least one component coupled between the at least one input node of the block model and the at least one multivibrator, the at least one multivibrator comprises a previous stage multivibrator of the block model,
wherein if the second subnetlist comprises the at least one component coupled between the at least one output node of the block model and the at least one multivibrator, the at least one multivibrator comprises a next stage multivibrator of the block model.

3. The model-building method of claim 2, wherein the top netlist further comprises a second input node and a second output node, and the model-building method further comprises:

obtaining, by the processor, a fourth subnetlist from the top netlist, wherein the fourth subnetlist comprises at least one component coupled between the at least one multivibrator and the second input node or between the at least one multivibrator and the second output node;

generating, by the processor, the top interface logic model, wherein the top interface logic model comprises the first subnetlist, the second subnetlist, the third subnetlist, and the fourth subnetlist.

4. The model-building method of claim 3, wherein if the fourth subnetlist comprises the at least one component coupled between the at least one multivibrator and the second input node, the at least one multivibrator comprises a first stage multivibrator of the top netlist, wherein if the third subnetlist comprises the at least one component coupled between the at least one multivibrator and the second output node, the at least one multivibrator comprises a last stage multivibrator of the top netlist.

5. The model-building method of claim 3, wherein the third subnetlist couples with a clock input node of the previous stage multivibrator of the block model, a clock input node of the next stage multivibrator of the block model, a clock input node of the first stage multivibrator of the top netlist, and a clock input node of the last stage multivibrator of the top netlist.

6. The model-building method of claim 3, wherein the top netlist further comprises a third input node and a third output node, and the model-building method further comprises:

obtaining, by the processor, a fifth subnetlist from the top netlist, wherein the fifth subnetlist comprises at least one component coupled between the third input node and the third output node; and generating, by the processor, the top interface logic model, wherein the top interface logic model comprises the first subnetlist, the second subnetlist, the third subnetlist, the fourth subnetlist, and the fifth subnetlist.

7. The model-building method of claim 3, further comprises:

obtaining, by the processor, a sixth subnetlist form the top netlist, wherein the sixth subnetlist coupled with the first subnetlist, the second subnetlist, and the fourth subnetlist through at least one equivalent capacitance; and generating, by the processor, the top interface logic model, wherein the top interface logic model comprises the first subnetlist, the second subnetlist, the third subnetlist, the fourth subnetlist, the sixth subnetlist, and the at least one equivalent capacitance.

8. The model-building method of claim 1, wherein the first input node and the first output node of the top netlist are not coupled with the at least one multivibrator.

9. The model-building method of claim 1, wherein the at least one multivibrator comprises at least one flip-flop.

10. The model-building method of claim 1, wherein the block model is a netlist, an interface logic model, or an extracted timing model.

* * * * *